United States Patent
Shmilovich et al.

(10) Patent No.: US 8,033,510 B2
(45) Date of Patent: Oct. 11, 2011

(54) LIFT AUGMENTATION SYSTEM AND ASSOCIATED METHOD

(75) Inventors: Arvin Shmilovich, Huntington Beach, CA (US); Yoram Yadlin, Irvine, CA (US); Roger W. Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 11/200,506

(22) Filed: Aug. 9, 2005

(65) Prior Publication Data

US 2007/0051855 A1    Mar. 8, 2007

(51) Int. Cl.
*B64C 21/04*    (2006.01)
*B64C 21/06*    (2006.01)

(52) U.S. Cl. ........ 244/208; 244/207; 244/209; 244/204; 244/200.1

(58) Field of Classification Search .......... 244/207, 244/208, 209, 204, 213, 214, 215, 200.1, 244/211, 216
See application file for complete search history.

(56) References Cited

U.S. PATENT DOCUMENTS

| | | | |
|---|---|---|---|
| 2,271,321 A * | 1/1942 | Wagner et al. | 244/211 |
| 2,406,920 A * | 9/1946 | Stalker | 244/209 |
| 2,478,793 A | 8/1949 | Trey | |
| 2,585,676 A | 2/1952 | Poisson-Quinton | |
| 2,945,644 A | 7/1960 | Colman | |
| 2,951,662 A | 9/1960 | Theodorsen | |
| 3,142,457 A | 7/1964 | Quenzler | |
| 3,831,886 A * | 8/1974 | Burdges et al. | 244/207 |
| 3,887,146 A * | 6/1975 | Bright | 244/12.1 |
| 3,917,193 A | 11/1975 | Runnels, Jr. | |
| 3,920,203 A | 11/1975 | Moorehead | |
| 4,392,621 A * | 7/1983 | Viets | 244/12.5 |
| 4,516,747 A * | 5/1985 | Lurz | 244/204 |
| 4,575,030 A | 3/1986 | Gratzer | |
| 4,600,172 A * | 7/1986 | Loth | 244/207 |
| 4,664,345 A | 5/1987 | Lurz | |
| 4,813,631 A | 3/1989 | Gratzer | |
| 4,863,118 A | 9/1989 | Stallings, Jr. et al. | |
| 5,209,438 A * | 5/1993 | Wygnanski | 244/203 |

(Continued)

FOREIGN PATENT DOCUMENTS

DE    33 20 481 A1    12/1984

(Continued)

OTHER PUBLICATIONS

The International Search Report and Written Opinion for International Application No. PCT/US2006/029092, mailed Jul. 31, 2008.

(Continued)

*Primary Examiner* — Tien Dinh
*Assistant Examiner* — Philip J Bonzell
(74) *Attorney, Agent, or Firm* — Alston & Bird LLP

(57) ABSTRACT

A system and method for generating lift provided by a multi-element aircraft wing are provided. The system includes a main wing element, a slat interconnected to the main wing element, and a flap interconnected to the main wing element. The system also includes at least one port defined in at least one of the slat, main wing element, and flap. In addition, the system includes at least one fluidic device operable to regulate fluid flow into and out of the at least one port to control boundary layer flow over at least one of the slat, main wing element, and flap.

36 Claims, 9 Drawing Sheets

U.S. PATENT DOCUMENTS

| | | | |
|---|---|---|---|
| 5,348,256 A | 9/1994 | Parikh | |
| 5,755,408 A * | 5/1998 | Schmidt et al. | 244/204 |
| 5,758,823 A * | 6/1998 | Glezer et al. | 239/4 |
| 5,803,410 A | 9/1998 | Hwang | |
| 5,806,807 A | 9/1998 | Haney | |
| 5,806,808 A | 9/1998 | O'Neil | |
| 5,813,625 A | 9/1998 | Hassan et al. | |
| 5,938,404 A | 8/1999 | Domzalski et al. | |
| 5,957,413 A | 9/1999 | Glezer et al. | |
| 5,988,522 A | 11/1999 | Glezer et al. | |
| 6,056,204 A * | 5/2000 | Glezer et al. | 239/8 |
| 6,079,671 A | 6/2000 | O'Neil et al. | |
| 6,092,990 A | 7/2000 | Hassan et al. | |
| 6,109,565 A | 8/2000 | King, Sr. | |
| 6,109,566 A | 8/2000 | Miller et al. | |
| 6,119,987 A * | 9/2000 | Kiknadze et al. | 244/204 |
| 6,123,145 A | 9/2000 | Glezer et al. | |
| 6,135,395 A * | 10/2000 | Collett | 244/209 |
| 6,176,454 B1 * | 1/2001 | Grosche et al. | 244/208 |
| 6,425,553 B1 | 7/2002 | Smith et al. | |
| 6,457,654 B1 * | 10/2002 | Glezer et al. | 239/4 |
| 6,471,477 B2 | 10/2002 | Hassan et al. | |
| 6,554,607 B1 | 4/2003 | Glezer et al. | |
| 6,629,674 B1 | 10/2003 | Saddoughi et al. | |
| 6,644,598 B2 * | 11/2003 | Glezer et al. | 244/208 |
| 6,722,581 B2 | 4/2004 | Saddoughi | |
| 6,752,358 B1 * | 6/2004 | Williams et al. | 244/208 |
| 6,796,533 B2 | 9/2004 | Barrett et al. | |
| 6,866,233 B2 * | 3/2005 | Patel et al. | 244/204 |
| 6,866,234 B1 * | 3/2005 | Hassan et al. | 244/208 |
| 6,899,302 B1 * | 5/2005 | Hassan et al. | 244/208 |
| 6,905,092 B2 | 6/2005 | Somers | |
| 6,994,297 B1 | 2/2006 | Hassan et al. | |
| 7,048,234 B2 * | 5/2006 | Recksiek et al. | 244/213 |
| 7,255,309 B2 * | 8/2007 | Boldrin et al. | 244/208 |
| 2002/0190165 A1 * | 12/2002 | Glezer et al. | 244/207 |
| 2005/0040293 A1 * | 2/2005 | Hassan et al. | 244/208 |
| 2006/0022092 A1 * | 2/2006 | Miller et al. | 244/200.1 |
| 2006/0102801 A1 * | 5/2006 | Manley | 244/208 |
| 2008/0245985 A1 * | 10/2008 | Heim et al. | 251/129.06 |

FOREIGN PATENT DOCUMENTS

| | | |
|---|---|---|
| EP | 0 068 737 A1 | 1/1983 |
| EP | 0 222 421 A1 | 7/1986 |
| FR | 952926 A | 11/1949 |
| GB | 675944 | 7/1952 |
| GB | 675994 | 7/1952 |
| GB | 2 088 521 A | 6/1982 |

OTHER PUBLICATIONS

Parikh et al., "Application of Boundary Layer Control to HSCT Low Speed Configuration," *Proceedings of the AIAA/AHS/ASEE Aircraft Design, Systems and Operations Conference*, Dayton, OH, Sep. 1990, pp. 1-12.

\* cited by examiner

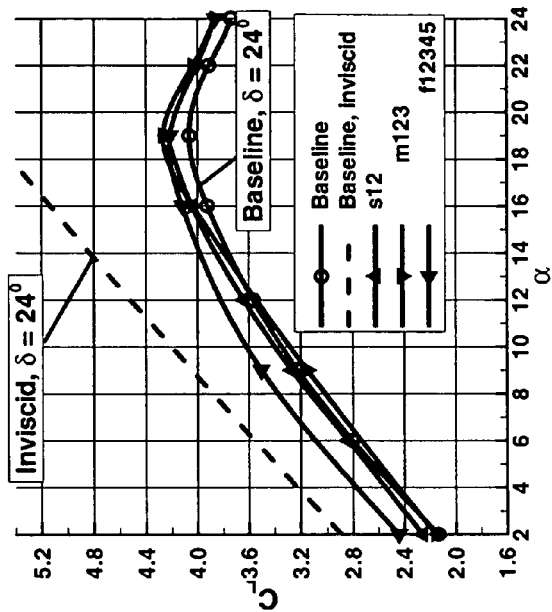
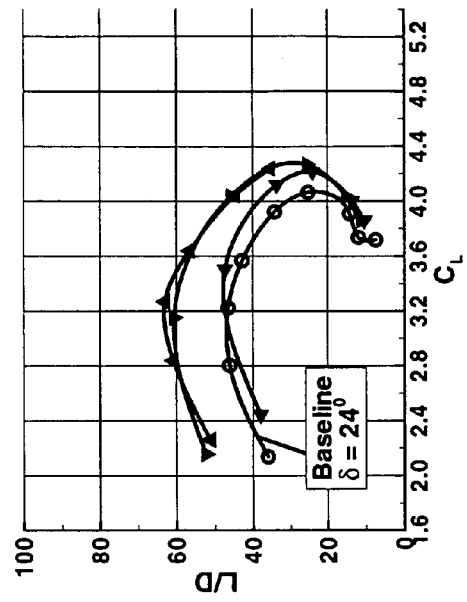
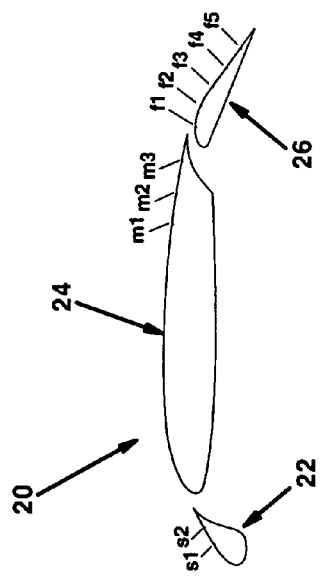
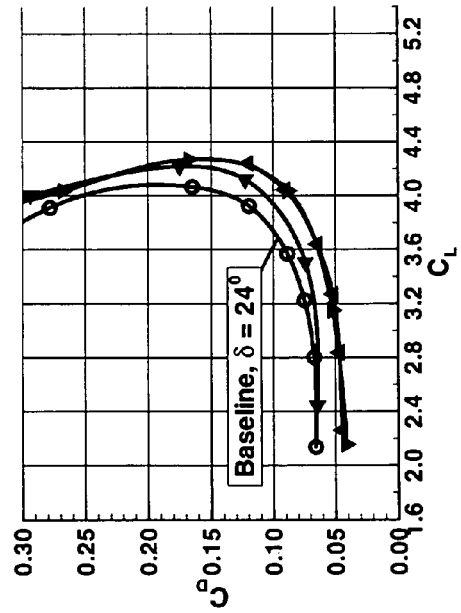
FIG. 3A
FIG. 3B
FIG. 3C
FIG. 3D

SW - Slat wake
MW - Main wake

● Baseline
○ Flow control (time-averaged)

LIFT AUGMENTATION SYSTEM AND ASSOCIATED METHOD

BACKGROUND OF THE INVENTION

1) Field of the Invention

The present invention relates to aircraft wings and, more particularly, to a lift augmentation system for increasing lift of a multi-element aircraft wing by controlling boundary layer flow over the aircraft wing.

2) Description of Related Art

Takeoff and landing performance are two principal design objectives for transport aircraft. Any aircraft design is limited to a maximum takeoff weight which is related to the runway length. For a given runway length, higher lift levels permits the maximum take-off weight to be increased. Equivalently, for a given weight, higher lift allows for lower stall speed and shorter runway length. From an operational perspective, high-lift capability results in access to a larger number of airports. Whether the requirement is for a larger payload or for shorter runways, superior high-lift capability is a key objective of the aircraft manufacturers.

For a given aircraft weight, it is possible to reduce stall speed by either increasing wing area or increasing the maximum lift coefficient ($C_{Lmax}$). Increasing the wing area is undesirable since it results in higher cruise drag. Therefore, increasing $C_{Lmax}$ is more desirable.

Efficient high-lift systems provide crucial performance advantages for both military and commercial aircraft. In the context of military aircraft, the ability to land in remote and austere fields is required such that military transports with short runway capability can effectively increase the global reach of the military force. With respect to commercial transports, the economical impact of high-lift systems is substantial. For example, an increase in the $C_{Lmax}$ results in an increased payload capacity for fixed approach speed, an increase in take-off L/D results in an increase in payload or increased range, and an increase in the lift coefficient at a constant angle of attack reduces the approach attitude and results in shortened landing gear, i.e., reduced aircraft weight.

Another aspect of the economic advantage attributable to enhanced high-lift capability relates to environmental regulations. A growing number of communities enforce stringent noise limits in airport environments, resulting in limited hours of operation of the aircraft. Moreover, aircraft that do not operate within permissible noise limits are financially penalized or even prohibited from operating in and out of certain airports. For example, to comply with environmental regulations, some aircraft have been forced to reduce payload, as well as reduce take-off and lift-off speeds during the initial climb. However, with fewer passengers on board, operating the aircraft was no longer economically viable. Consequently, there is a great economic incentive to develop aircraft with improved takeoff and landing performance.

The aerodynamic design is especially challenging for take-off and landing conditions where the fluid flow is dominated by viscous effects. Techniques for altering the viscous flow structures at these high-lift conditions are highly desirable due to the increased potential for improved efficiency. Over the years, a variety of flow control strategies have been developed for a wide range of aerodynamic applications, such as various active and passive systems, actuators, and mechanisms for altering the flow over a wing or delaying boundary layer separation. For example, U.S. Pat. No. 6,905,092 to Somers discloses a laminar-flow airfoil that includes fore and aft airfoil elements and a slot region located therebetween. The fore and aft airfoil elements induce laminar flow over substantially all of the fore airfoil element and laminar flow in the slot region.

Current aircraft achieve high levels of lift by employing systems that are deployed only during take-off and landing. These systems usually consist of a movable leading-edge slat and one or more trailing-edge flaps. When deployed, the wing transforms into a multi-element configuration, effectively increasing camber and chord length and resulting in added lift. The flow over a multi-element high-lift system is highly interactive. For instance, the trailing-edge flap is strongly influenced by the downwash generated by the lift on the main wing.

The maximum lift that can be achieved by such a multi-element system is limited by viscous effects resulting from strong adverse pressure gradients. The maximum lift level achieved can be limited by boundary layer separation in the vicinity of the slat and main wing leading edge, as well as by boundary-layer thickening or separation on the trailing edge of the main wing or on the flap(s). Lift can also be limited by boundary-layer thickening or separation on the trailing edge of the main wing or on the flap(s). In addition, the maximum lift level can be limited by the bursting of the viscous wake from the slat or main wing as it passes through the high pressure gradients developed by the flap. In this case, the boundary layers on each of the high-lift components may be attached, but the rapid spreading of the viscous wakes limits the maximum lift that can be achieved.

It would therefore be advantageous to provide a system that is capable of controlling boundary layer flow over a multi-element aircraft wing for improved aerodynamic performance of a multi-element wing. Moreover, it would be advantageous to provide a system that is adaptable to a wide range of angles of attack and flight conditions.

BRIEF SUMMARY OF THE INVENTION

Embodiments of the present invention address the above needs and achieve other advantages by providing a system for increasing lift of a multi-element aircraft wing. The system employs a plurality of ports and fluidic devices to regulate fluid flow over the aircraft wing. As such, the ports and fluidic devices may be located in various locations on the multi-element aircraft wing to control the boundary layer flow over the wing and reduce viscous effects. Computations have shown that actuating a plurality of ports at certain locations results in increased $C_L$ and a much more streamlined flow. Near inviscid lift levels can be obtained over the range of angles-of-attack when the ports are actuated at critical locations on the individual elements of the aircraft wing.

In one embodiment of the present invention, a system for generating lift from a multi-element aircraft wing is provided. The system includes a slat and a flap interconnected to a main wing element. The system also includes at least one port defined in the slat, main wing element, and/or flap. In addition, the system includes at least one fluidic device operable to regulate fluid flow into and out of the port(s) to control boundary layer flow over the slat, main wing element, and/or flap.

In various aspects of the present invention, the fluidic device may be an electromagnetic actuator, a piezoelectric actuator, a combustion-based actuator, a diaphragm, or a piston. The fluidic device may employ zero net mass flow to regulate fluid flow through the port. The fluidic device may actuate a respective port or a plurality of ports such that fluid flows through each of the actuated ports simultaneously. In addition, the fluidic device can actuate one or more ports associated with the slat, main wing element, and/or flap. The port may be defined in an upper surface of the slat, main wing element, and/or flap, and may be defined in an aft portion of the slat and/or main wing element. The slat and flap may be operably interconnected to the main wing element such that an angle of deflection of the slat and flap may be adjusted with respect to the main wing element.

A further aspect of the present invention provides an additional system for generating lift from a multi-element aircraft wing. The system includes a plurality of wing elements (e.g., slat, main wing element, and/or flap), wherein each of the wing elements is operatively interconnected to each other. The wing elements may be interconnected such that an angle of deflection of one wing element is adjustable with respect to another wing element. The system also includes at least one port defined in at least one of the wing elements, and at least one fluidic device operable to regulate fluid flow into and out of the port(s) to control boundary layer flow over at least one of the wing elements.

Embodiments of the present invention also provide a method for increasing lift of an aircraft. The method includes initiating fluid flow over a multi-element aircraft wing comprising a plurality of wing elements, and regulating fluid flow through at least one port defined in at least one of the wing elements to control boundary layer flow over the wing elements. Initiating fluid flow could include commencing take-off or landing of the aircraft such that the onset of flow over the wing element is initiated. Moreover, the method could further include adjusting an angle of deflection of at least one of the wing elements with respect to another wing element.

In various aspects of the present invention, the regulating step includes actuating a fluidic device associated with at least one port. The actuating step may include actuating a plurality of ports simultaneously. In addition, the actuating step may include actuating at least one port associated with one or more of the wing elements. The regulating step could include ingesting fluid into a respective port or expelling fluid from a respective port.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 1A-B are perspective views of a multi-element aircraft wing according to one embodiment of the present invention;

FIG. 3A is a cross-sectional view of a multi-element aircraft wing according to another embodiment of the present invention;

Figure 4A:
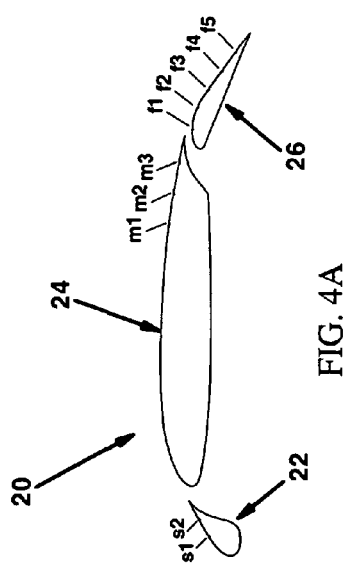
Figure 4B:
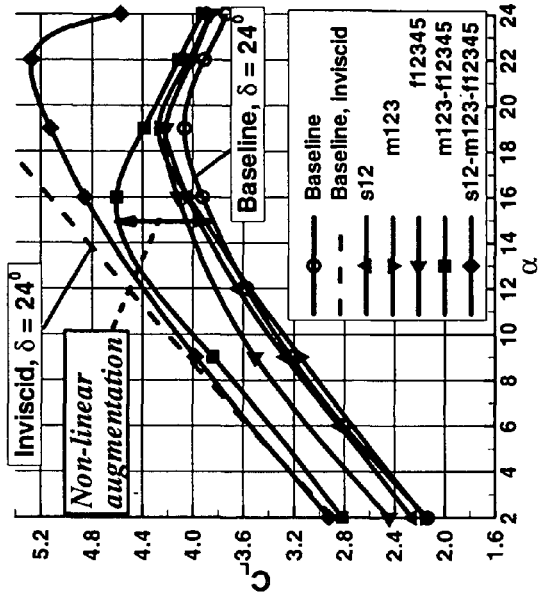
Figure 4C:
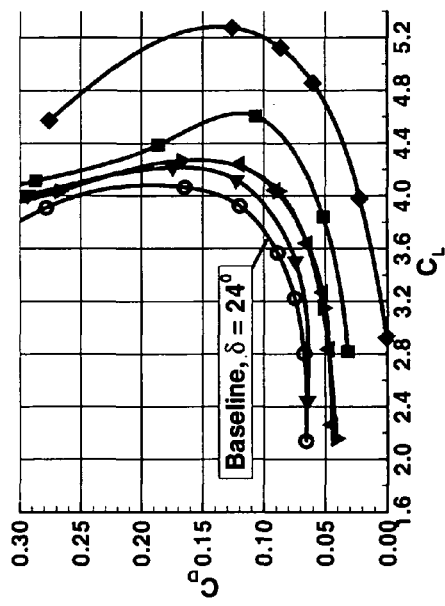
Figure 4D:
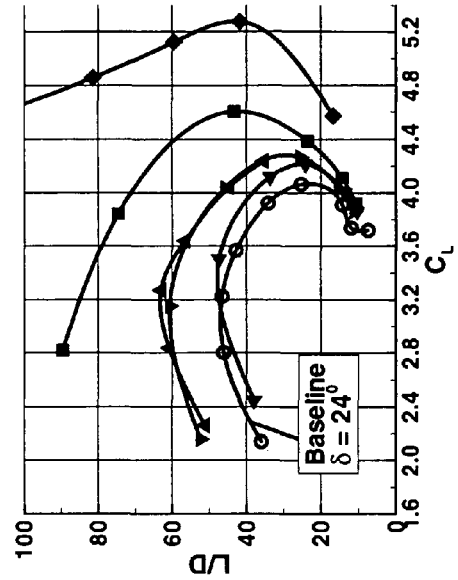
Figure 5A:
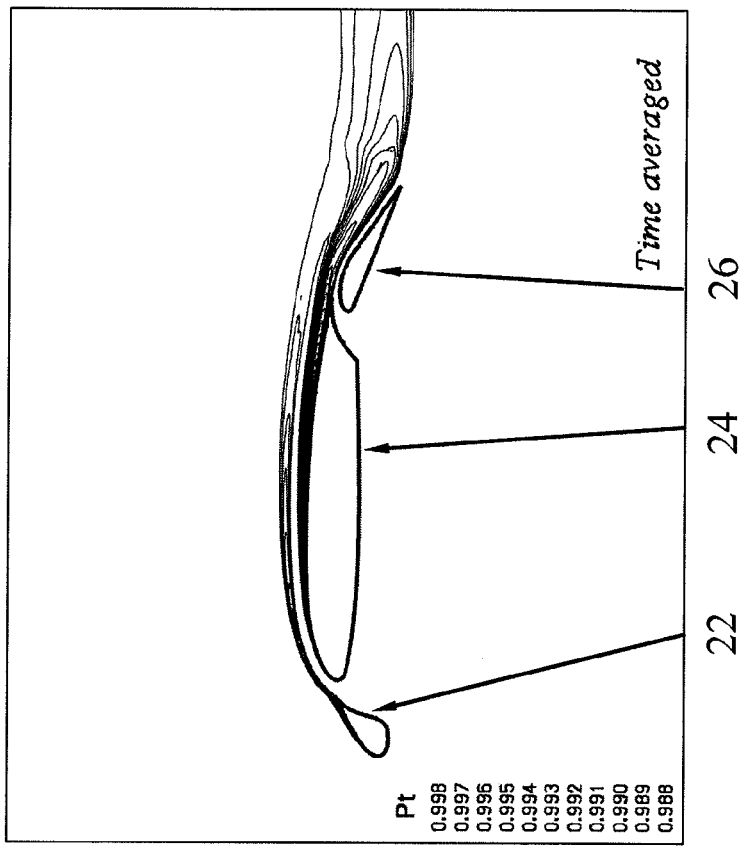
Figure 5B:
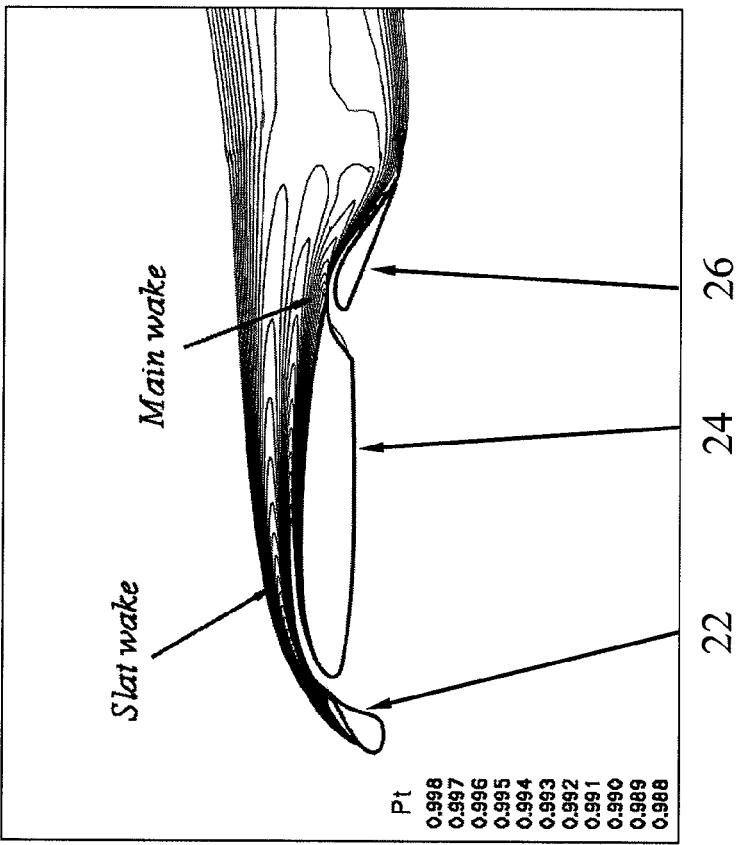
Figures 6A, 6B, 6C, 6D, 6E, 6F:
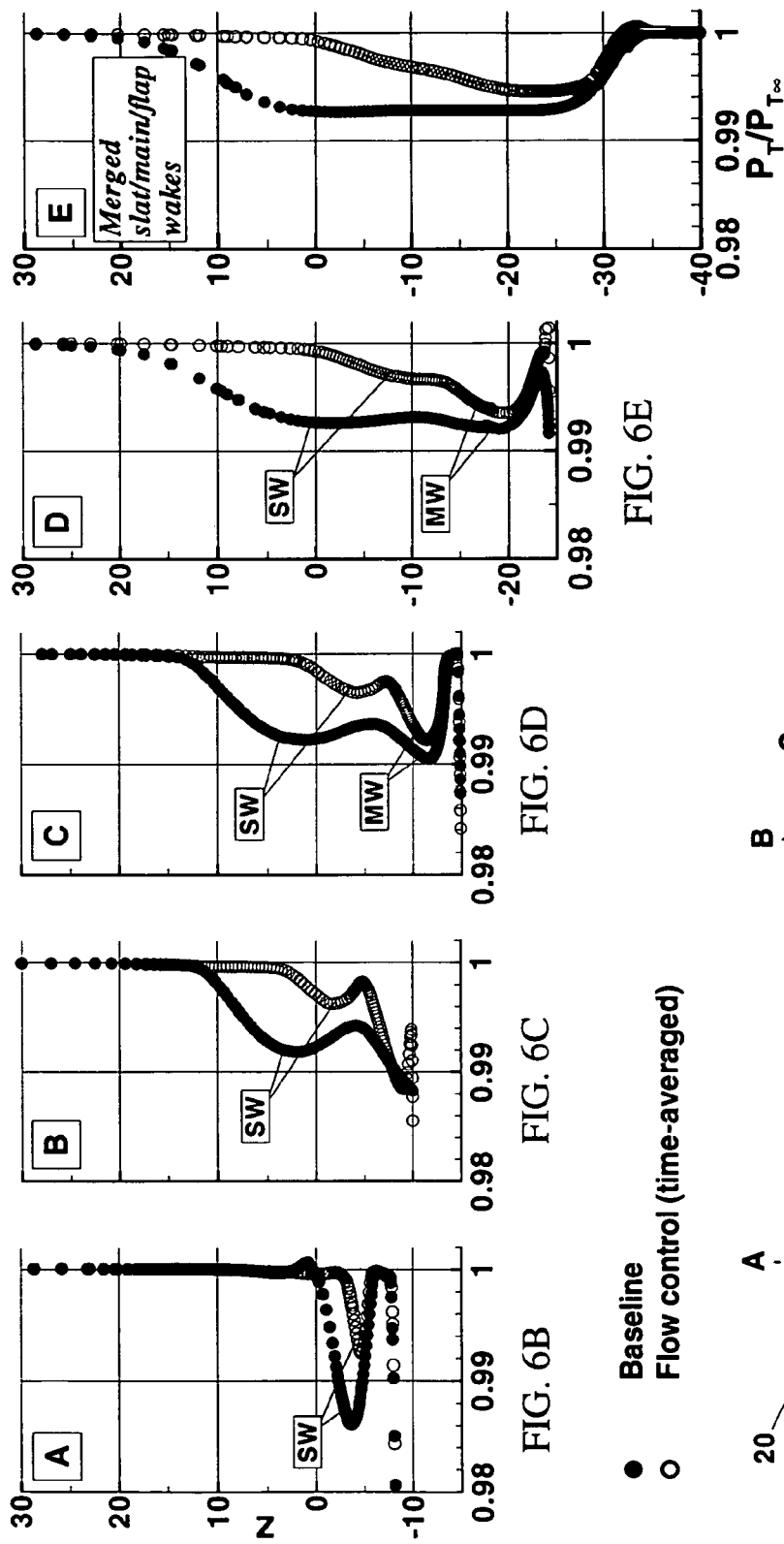
Figure 7A:
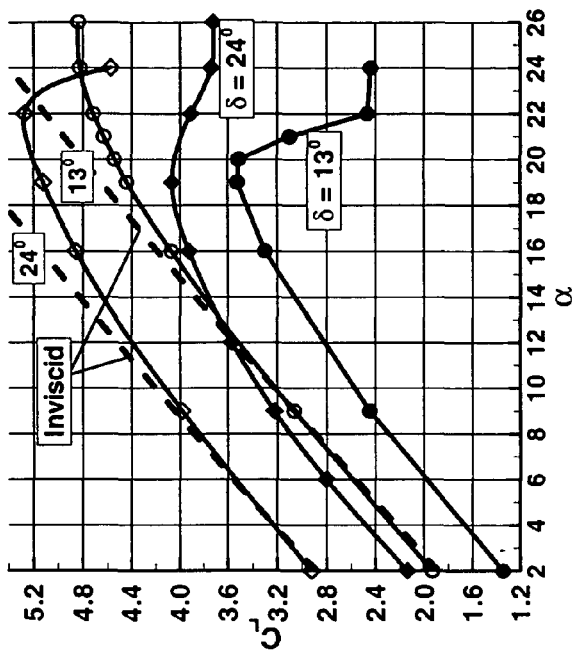
Figure 7B:
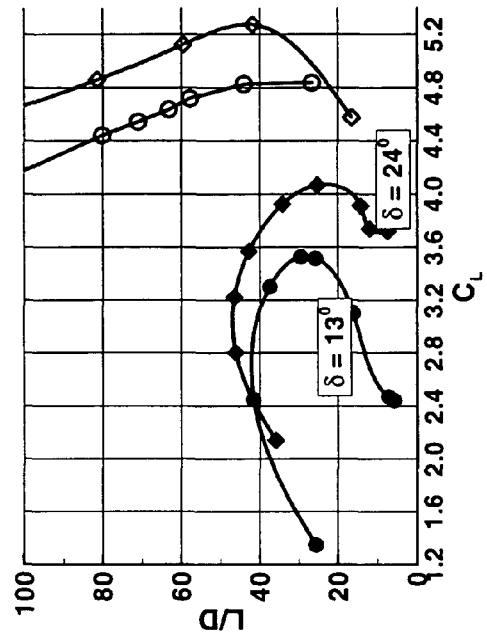
Figure 7C:
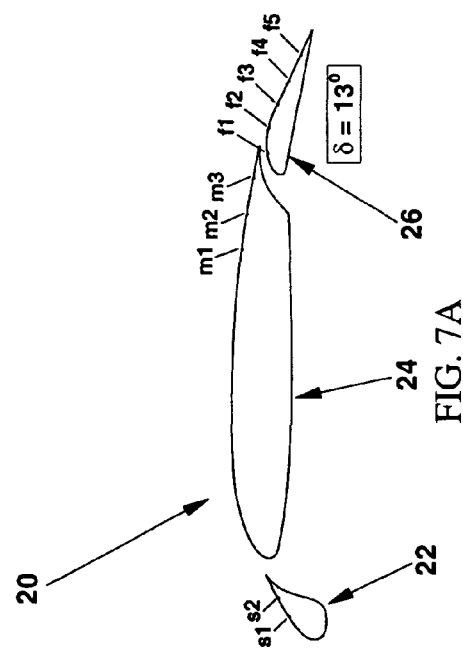
Figure 7D:
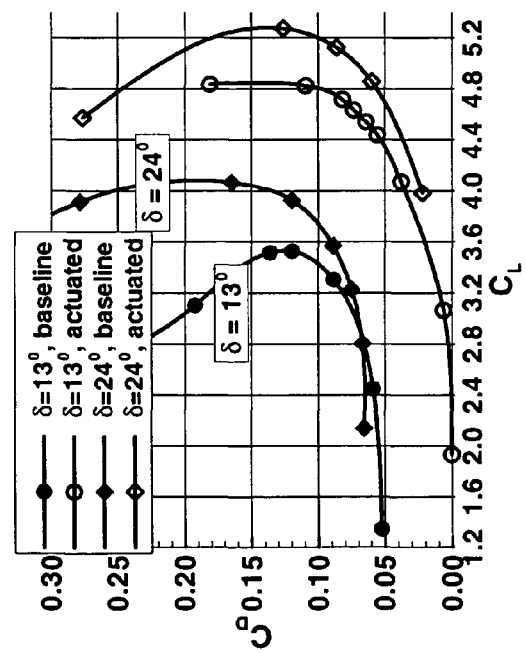
Figure 8A:
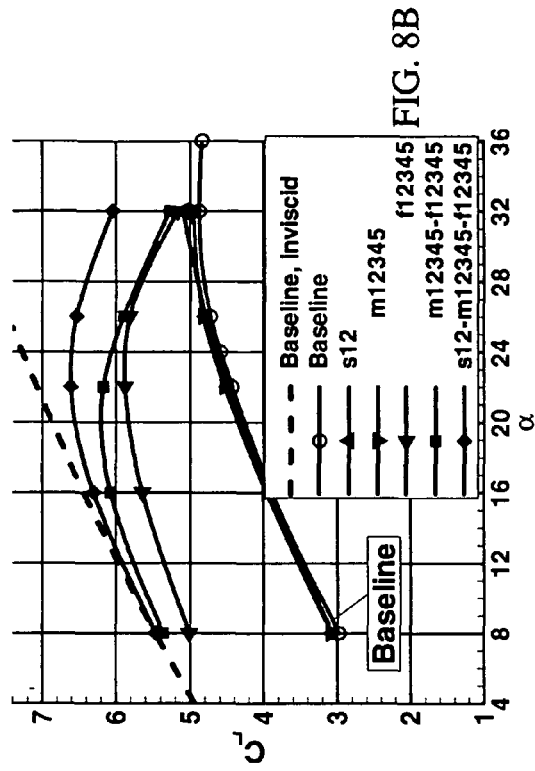
Figure 8B:
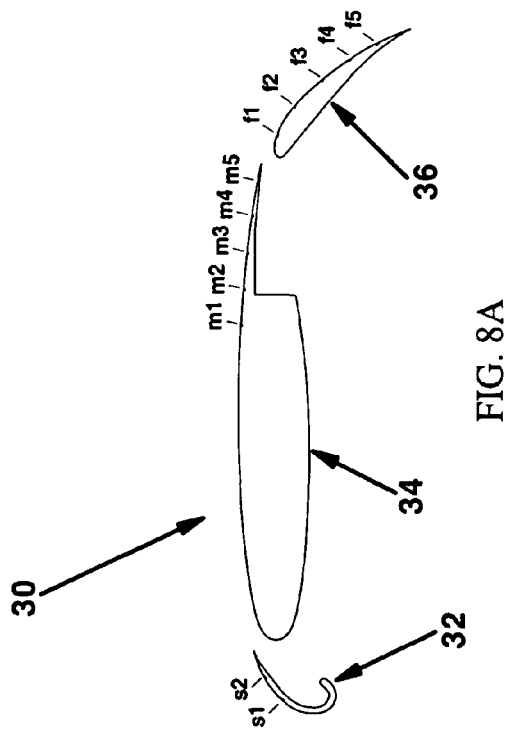
Figure 8D:
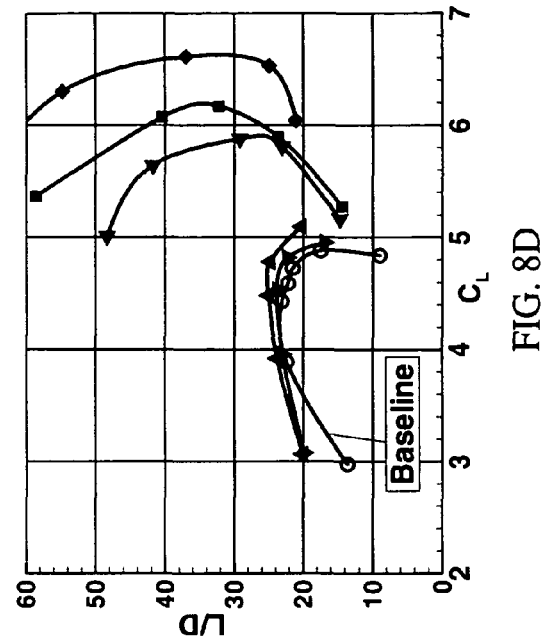
Figure 8C:
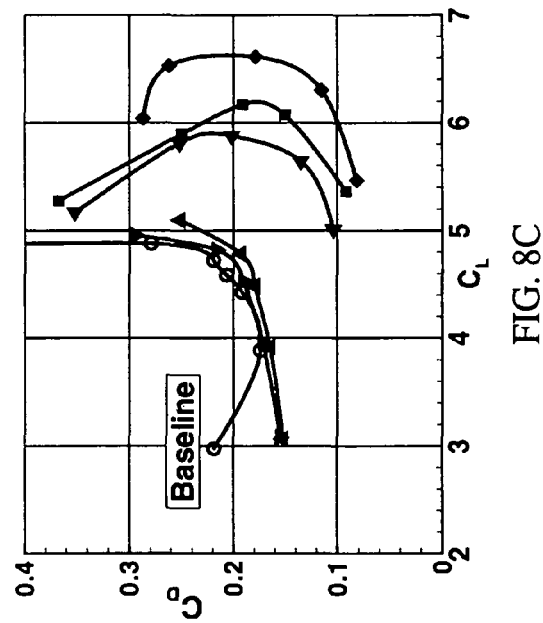
Figure 9B:
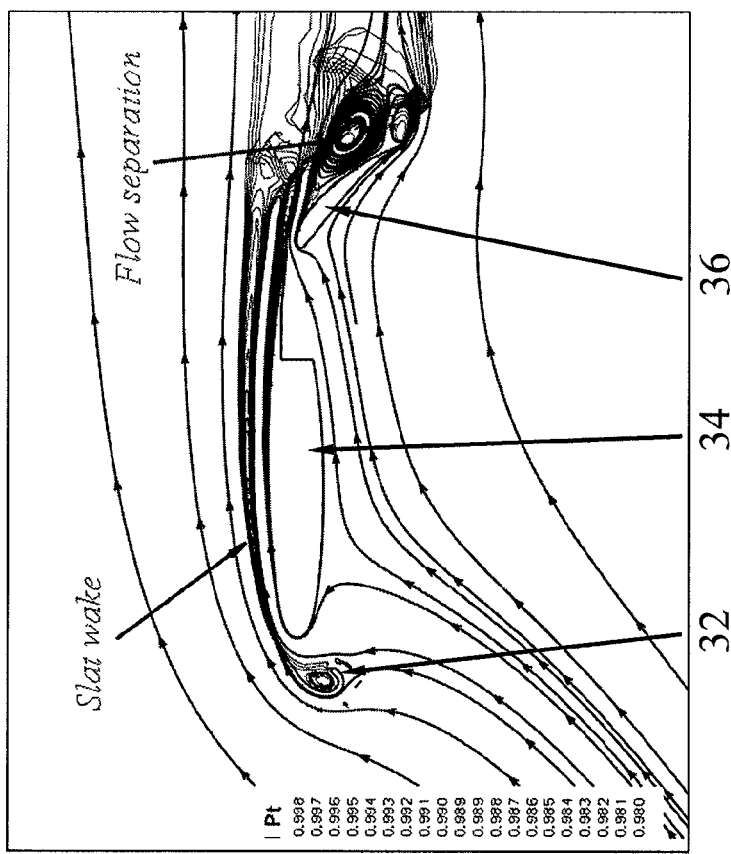
Figure 9A:
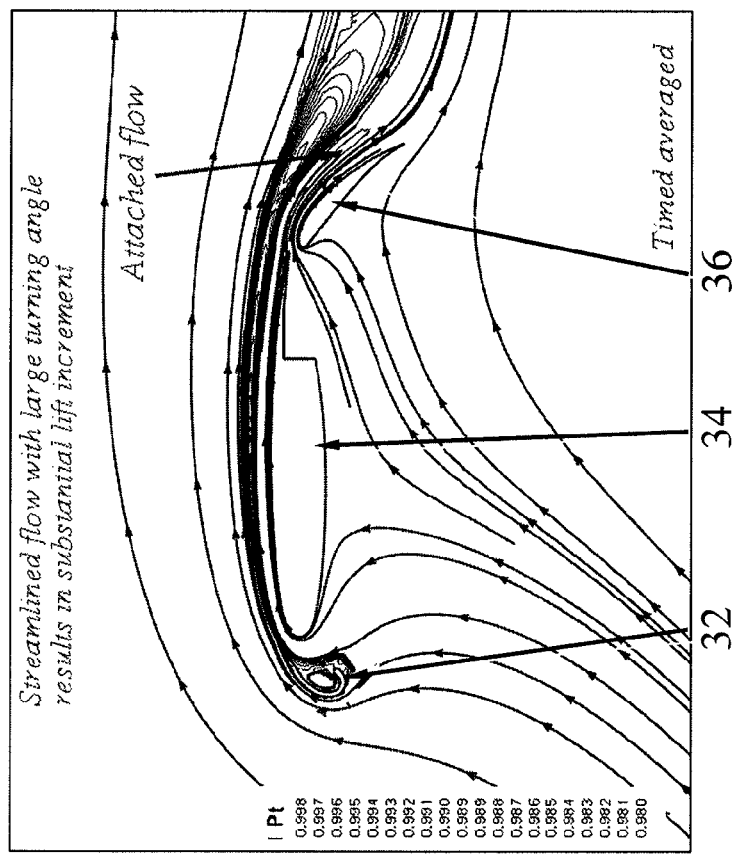

FIGS. 3B-D are graphical images depicting various aerodynamic properties of the multi-element aircraft wing shown in FIG. 3A;

FIG. 4A is a cross-sectional view of a multi-element aircraft wing according to another embodiment of the present invention;

FIGS. 4B-D are graphical images depicting various aerodynamic properties of the multi-element aircraft wing shown in FIG. 4A;

FIG. 5A is an image illustrating a total pressure field over a baseline multi-element aircraft wing;

FIG. 5B is an image illustrating a total field over a multi-element aircraft wing with flow control according to one embodiment of the present invention;

FIG. 6A is a cross-sectional view of a multi-element aircraft wing according to one embodiment of the present invention;

FIGS. 6B-F are graphical images depicting total pressure profiles of the multi-element aircraft wing shown in FIG. 6A;

FIG. 7A is a cross-sectional view of a multi-element aircraft wing according to one embodiment of the present invention;

FIGS. 7B-D are graphical images depicting various aerodynamic properties of the multi-element aircraft wing shown in FIG. 7A;

FIG. 8A is a cross-sectional view of a multi-element aircraft wing according to another embodiment of the present invention;

FIGS. 8B-D are graphical images depicting various aerodynamic properties of the multi-element aircraft wing shown in FIG. 8A;

FIG. 9A is an image illustrating a total pressure field over a baseline multi-element aircraft wing; and FIG. 9B is an image illustrating a total pressure field over a multi-element aircraft wing with flow control according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1A:
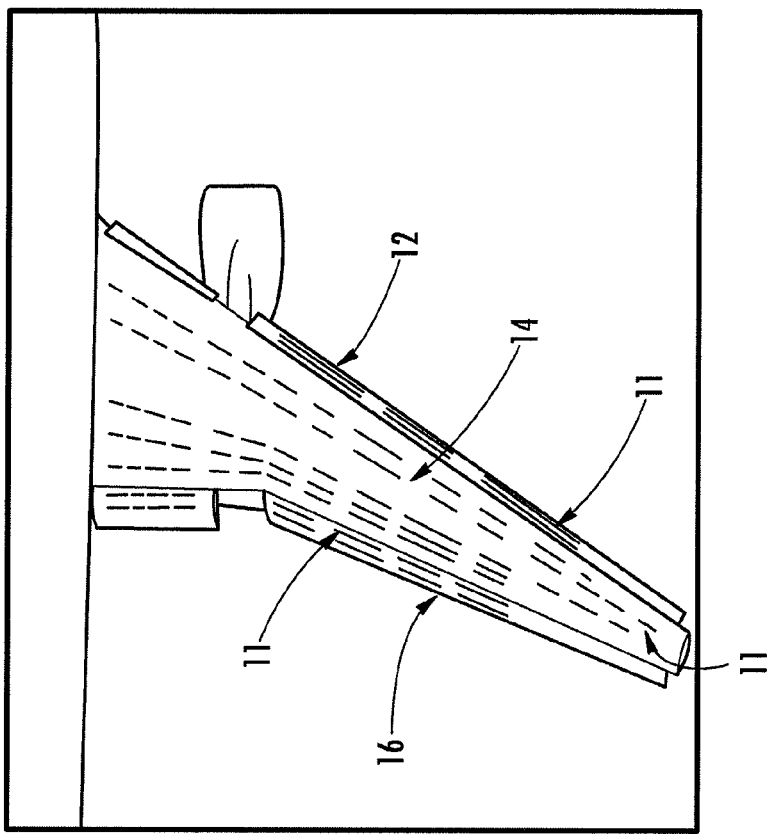
Figure 1B:
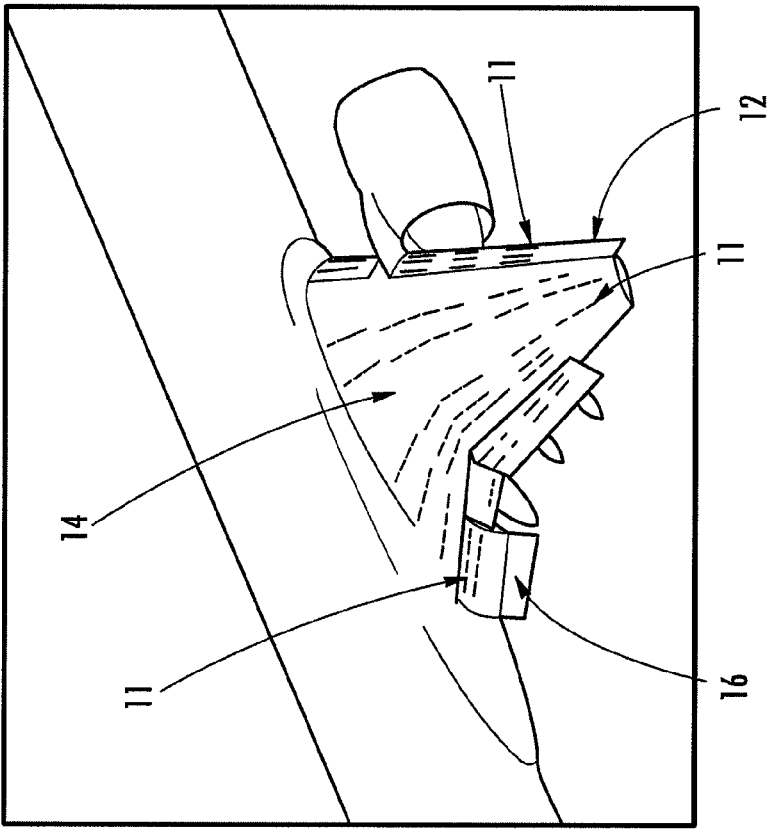

Referring now to the drawings and, in particular to FIGS. 1A-B, there is shown a system for increasing lift of a multi-element aircraft wing 10. The aircraft wing 10 generally includes a plurality of wing elements 12, 14, and 16. Each of the wing elements 12, 14, and 16 includes a plurality of ports 11 defined therein. Fluidic devices (not shown) are utilized to regulate the flow of fluid into and out of the ports 11 to control boundary layer flow over each of the wing elements 12, 14, and 16. Generally, the fluidic devices are selectively operable to control the fluid flow through the ports 11 during take-off and landing to improve the performance of the aircraft wing 10. As such, the aerodynamic properties, and particularly lift, of the aircraft wing 10 may be improved over a range of angles of attack and under various flight conditions.

The multi-element aircraft wing 10, or airfoil, typically includes a plurality of wing elements, namely, a slat 12, a main wing element 14, and a flap 16. The multi-element wing 10, as known to those of ordinary skill in the art, may have various configurations. For example, although both a slat 12 and flap 16 are shown in FIGS. 1A-B, the multi-element wing 10 could include a main wing element 14 and one or more slats 12 and/or one or more flaps 16. Moreover, the slat 12 could be various configurations, such as a Krueger slat, a ventilated slat, a sealed slat, or a droop-nose slat. Also, the flap 16 could be non-slotted, i.e., using a simple hinge mode of deflection. Slats 12 may be used to reduce the pressure peak near the nose of the aircraft wing by changing the nose camber. The flap 16 could also be various configurations, such as a Fowler flap or a single, double, or triple-slotted flap. Flaps 16 may be used to change the pressure distribution by increasing the camber of the aircraft wing and allowing more of the lift to be carried over the rear portion of the wing. Furthermore, the main wing element 14 could be various configurations (i.e., camber, chord length, leading-edge radius, etc.) depending on the type of aircraft or aerodynamic properties desired. As such, the multi-element aircraft wing 10 may include various configurations of slats 12, main wing element 14, and flap 16 such that the multi-element aircraft wing may have various airfoil profiles for achieving desired aerodynamic properties, such as a maximum lift coefficient. Although a multi-element aircraft wing 10 is shown, it is understood that flow may be regulated over any number of multi-element lifting surfaces in order to improve aerodynamic performance. For example, ports may be defined in spoilers or ailerons, or other multi-element airfoil bodies capable of producing lift.

Figure 2:
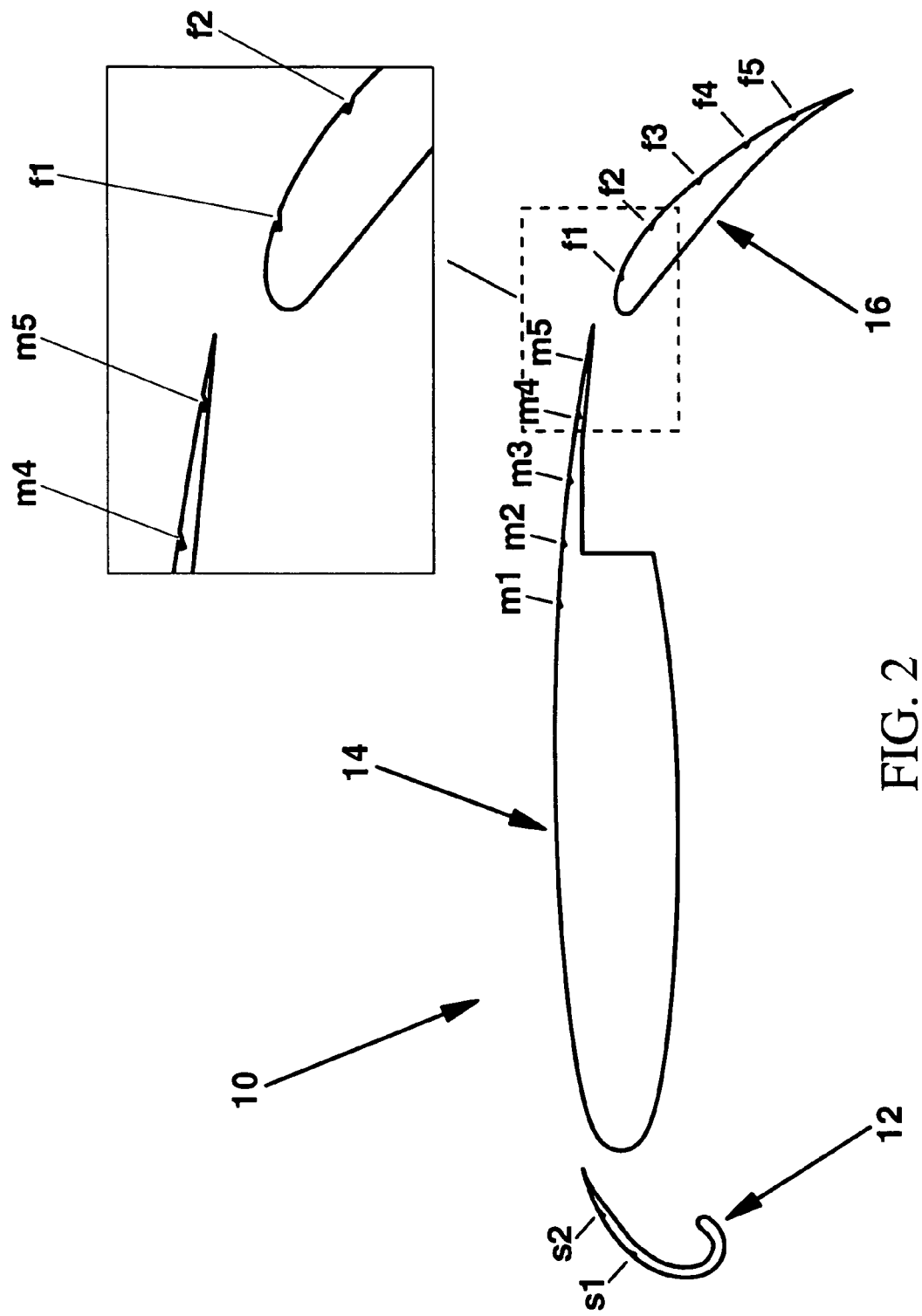
FIG. 2 is a cross-sectional view of a multi-element aircraft wing according to one embodiment of the present invention.

Each of the slat 12, main wing element 14, and flap 16 includes one or more ports for controlling the boundary layer along the surface of the multi-element aircraft wing 10. In particular, FIG. 2 illustrates that the slat 12 includes a pair of ports s1-s2, the main wing element 14 includes a plurality of ports m1, m2, m3, m4, and m5, and the flap 16 includes a plurality of ports f1, f2, f3, f4 and f5. Each of the ports is defined in an upper surface of a respective slat 12, main wing element 14, and flap 16. However, the ports could be defined on the lower surface of the multi-element aircraft wing 10, or on both the upper and lower surfaces. The ports are generally defined to extend into a respective slat 12, main wing element 14, or flap 16 such that fluid may be ingested or expelled through the ports. Thus, the ports generally include an orifice or opening adjacent to the surface of the slat 12, main wing element 14, and flap 16, that further extend into the slat, main wing element, and flap, respectively. Moreover, ports defined in a respective slat 12, main wing element 14, and flap 16 may be interconnected such that one port may facilitate fluid into the port at one location, while a second port facilitates flow out of the port at a different location. However, the fluid could also flow from a first port and into a temporary holding area such that the fluid could be expelled through the first port or out of one or more additional port. Typically the ports s1-s2 and m1-m5 are defined in an aft portion of respective slat 12 and main wing element 14, respectively, however, the ports could be defined at various locations on the slat, main wing element, or flap to achieve desired aerodynamic properties. Furthermore, although cross-sectional views of the multi-element aircraft wing 10 are shown, it is understood that ports may be defined in various spanwise configurations along the wing (e.g., aligned, staggered, non-aligned, etc.). Moreover, the ports may be various sizes and configurations, such as circular, oval, or any other desired shape.

A plurality of fluidic devices (not shown) are employed to regulate fluid flow into or out of the ports. The fluidic devices typically employ zero net mass flow (i.e., no external fluid source is required) to regulate fluid flow through the ports and may use various types of mechanisms to actuate one or more ports. For example, an electromagnetic actuator, a piezoelectric actuator, a combustion-based actuator, a diaphragm, a piston, or a pump could be used to actuate the ports. A fluidic device may actuate a single port or may be operable to actuate a plurality of ports to affect the boundary layer flow over the multi-element aircraft wing 10. Additionally, several ports may be actuated simultaneously. As used herein, actuating includes opening a port and/or forcing fluid to enter or exit the port, such as by ingesting or ejecting the fluid therethrough. Thus, fluidic devices are capable of regulating fluid flow through the ports by ingesting fluid into one or more ports or expelling fluid out of one more ports. For a further description of an exemplary system for ingesting and ejecting fluid, see U.S. patent application Ser. No. 11/200,515, entitled "System for Aerodynamic Flows and Associated Method," filed concurrently herewith, which is assigned to the present assignee and incorporated herein by reference. In addition, embodiments of the present invention may employ fluidic sources such as compressors or bleed off the aircraft engines.

Moreover, the fluidic devices are capable of actuating ports associated with the slat 12, main wing element 14, or flap 16. However, the fluidic devices could also actuate ports associated with each of the slat 12, main wing element 14, and flap 16 to achieve synergistic control of fluid flow for achieving higher lift levels. The ports are generally actuated during take-off or landing of an aircraft, where achieving high lift is critical. In addition, the actuation is typically continuous, although ports could be selectively regulated during take-off and landing to achieve improved performance.

FIG. 3A illustrates a multi-element aircraft wing 20 including ports defined in each of a slat 22, main wing element 24, and flap 26. The slat 22 includes ports s1-s2, the main wing element 24 includes ports m1-m3, and the flap 26 includes ports f1-f5. FIGS. 3B-D provide graphs depicting various aerodynamic properties for the multi-element aircraft wing 20. Because the graphs are based on two-dimensional simulation, induced drag was not accounted for. For purposes of simulating take-off conditions, the slat 22 is extended, and the flap is deflected at an angle of 24°.

FIG. 3B shows a lift coefficient, $C_L$, plotted against an angle of attack, $\alpha$, for inviscid flow, flow over a baseline multi-element aircraft wing (i.e., no ports actuated), and flow over the multi-element aircraft wing with the ports of one of the slat 22, main wing element 24, or flap 26 actuated (See the legend shown in conjunction with FIG. 3B for identifying the ports that are actuated). As shown in FIG. 3A, actuating the ports f1-f5 of the flap 26 provides the greatest increase in $C_L$, while actuating ports s1-s2 of the slat performs slightly better than actuating ports m1-m5 of the main wing element at angles of attack less than about 15°. Furthermore, each of the slat 22, main wing element 24, and flap 26 perform about the same at angles of attack greater than 17°, while the slat, main wing element, and flap all perform better than the baseline at approximately an angle of attack greater than 14°. FIGS. 3C (drag polar) and 3D also illustrate that actuating the ports in any one of the slat 22, main wing element 24, or flap 26 generally results in increased $C_L$ and L/D in comparison to the baseline wing. As shown in FIG. 3C, actuating ports in the multi-element aircraft wing 20 results in an increased $C_L$ in comparison to the baseline aircraft wing for a given coefficient of drag ($C_D$). As described above, increasing $C_{Lmax}$, i.e., the maximum attainable value of $C_L$, will decrease the stall speed thereby facilitating shorter take-off and landing distances. Moreover, payload capacity may be increased and the approach attitude decreased.

FIG. 4A also illustrates a multi-element aircraft wing 20 having ports defined in a slat 22, main wing element 24, and flap 26. In addition, FIGS. 4B-4C depict the same aerodynamic properties as that shown in FIGS. 3B-3C. However, FIGS. 4B-4C demonstrate that actuating a combination of ports in the slat 22, main wing element 24, and flap 26 reaches inviscid flow at angles of attack less than about 6° and near inviscid flow at angles of attack above about 6°. Furthermore, FIG. 4B shows that actuating either m1-m3 or f1-f5 alone does not result in pronounced increases in $C_L$ over the baseline multi-element aircraft wing. However, actuating both m1-m3 and f1-f5 or s1-s2, m1-m3, and f1-f5 results in a significant increase in $C_L$ over the baseline wing over the entire linear range of angles of attack. Thus, actuating m1-m3 energizes the retarded viscous layer in the aft portion of the main wing element 24 and boosts the load over the entire multi-element aircraft wing 20. Moreover, FIGS. 4C-4D demonstrate increased $C_L$ and L/D when the same combination of ports are actuated versus individually actuating ports in the slat 22, main wing element 24, or flap 26.

FIGS. 5A-5B represent takeoff conditions for which the flap 26 is deflected at 24° and the angle of attack is 19°. FIG. 5A depicts the total pressure field over a baseline multi-element aircraft wing, while FIG. 5B illustrates the multi-element aircraft wing 20 shown in FIG. 4A, where the ports s1-s2, m1-m3, and f1-f5 are actuated. The images illustrate the bounded viscous layers and the wakes shedding off the various elements, where $C_L$ equals about 4.06 for the baseline wing and 5.12 for the flow control on the multi-element aircraft wing 20. FIG. 5B demonstrates the reduced size and intensity of the wakes of the slat 22, the main wing element 24 and the flap 26. The slat wake shown in FIG. 5B traverses the adverse pressure gradient regions of the main wing element 24 and flap 26 without significant degradation in flow quality (i.e., less tendency for off-surface flow reversal). Total pressure loss is a measure of aerodynamic inefficiency and the reduced levels in the actuated flow case is indicative of improved performance. Particularly, the actuated flow results in higher lift and lower drag. Actuation results in a more streamlined flow, a larger turning angle in the fore and aft portion of the multi-element aircraft wing 20 (higher circulation) and an increased lift level.

FIGS. 6A-6F provide graphical images of the total pressure profiles at positions A-E for tracking the wakes corresponding to the slat 22, the main wing element 24, and the flap 26. As shown in FIG. 6B, the slat wake for the multi-element wing 20 employing actuating ports in each of the slat 22, main wing element 24, and flap 26 reduces the total pressure loss at location A on the multi-element wing. The reduction in wake intensity and width is indicative of increased aerodynamic efficiency. Similarly, FIGS. 6C-6F depict the total pressure profiles for wakes at locations B-E, respectively, where each of the figures demonstrates that the wakes corresponding to the baseline multi-element wing are wider and at larger distances than the multi-element wing 20 utilizing flow control.

FIGS. 7A-7D illustrate a comparison between baseline multi-element aircraft wings with flap deflection of 13° and 24° and the multi-element aircraft wing 20 with the same flap deflection but with ports (s1-s2, m1-m3, and f1-f5) actuated in each of the slat 22, main wing element 24, and flap 26, respectively. FIG. 7B demonstrates that actuating ports in the multi-element aircraft wing 20 not only generates greater $C_L$, but also a higher $C_L$ at higher angles of attack. For example, at δ=24° flap deflection, actuating ports s1-s2, m1-m3, and f1-f5 results in a $C_{Lmax}$ of about 5.2 at an angle of attack of about 22°, while the baseline wing has a $C_{Lmax}$ of about 4.1 at an angle of attack of about 19°. As such, lift is increased, stall is delayed until higher angles of attack, and the flow is nearly inviscid at lower angles of attack. Furthermore, FIG. 7B shows that an increased flap deflection (i.e., δ=24°) results in an increased $C_L$ but causes flow to diverge from inviscid flow sooner than a flap deflection of 13°. FIGS. 7C-7D further demonstrate that the $C_L$ is increased by actuating the ports, and the drag $C_D$ is substantially reduced. Consequently, L/D increases with flow actuation.

FIG. 8A depicts a multi-element aircraft wing 30 according to another embodiment of the present invention. In this particular embodiment, the multi-element aircraft wing 30 is an exemplary transport wing. The multi-element aircraft wing 30 includes a Kruger slat 32, a main wing element 34, and a 35% flap 36 with Fowler motion. Moreover, the slat 32 includes ports s1-s2, the main wing element 34 includes ports m1-m5, and the flap 36 includes ports f1-f5. The flap 36 is deflected 50° to represent landing conditions in which flow is separated over most of the flap even at low angles of attack. As before, FIG. 8B demonstrates that actuating ports s1-s2, m1-m5, or f1-f5 alone/individually is not as effective in increasing $C_L$ as actuating both of ports m1-m5 and f1-f5 or all of ports s1-s2, m1-m5, and f1-f5. In general, actuating all of the ports of the multi-element aircraft wing 30 approaches inviscid flow at lower angles of attack (i.e., less than 16°) and achieves a higher $C_L$ than the baseline multi-element aircraft wing (i.e., no ports actuated). Moreover, it is apparent that actuating ports s1-s2, m1-m5, and f1-f5 in combination results in the greatest increases in $C_L$. Also, significant reduction in drag and increase in L/D is demonstrated in FIGS. 7C and 7D, respectively.

FIGS. 9A and 9B illustrate an image of the total pressure field for δ=50° and α=22° over the baseline multi-element aircraft wing ($C_L$=4.42) and the multi-element aircraft wing 30 shown in FIG. 8A, where each of the ports s1-s2, m1-m5, and f1-f5 are actuated ($C_L$=6.61), respectively. As depicted, FIG. 9B also demonstrates a more streamlined flow over the multi-element aircraft wing 30, especially proximate to the aft portion of the main wing element 34 and the flap 36. Flow reversal is also eliminated in the vicinity of the flap 36. Therefore, actuating the ports of the multi-element aircraft wing 30 facilitates improved lift characteristics, mitigating the viscous effects at various regions on the wing.

Embodiments of the present invention provide several advantages. In particular, the multi-element aircraft wing includes fluidic devices and ports for controlling the boundary layer flow of fluid over the wing. By locating the ports at critical locations (i.e., locations of adverse pressure gradients, flow separation, or recirculation) on the multi-element aircraft wing and actuating particular ports at predetermined flight conditions, the aerodynamic properties of the wing, including lift, may be improved over a wide range of angles of attack. Actuating the ports in the multi-element aircraft wing may result in flow effects normally associated with flaps but with reduced drag and improved stall characteristics. Moreover, the actuation on the multi-element aircraft wing results in near inviscid flow fields, thereby mitigating the viscous effects and reducing the propensity of boundary layer separation at various regions on the wing. The ports and fluidic devices may be used to manage the load on the multi-element aircraft wing to control the induced drag for takeoff (spanwise elliptical load for reduced drag) and landing (spanwise triangular load for steeper approach angles). Also, the actuation can be properly applied to reduce structural excitation and limit structural fatigue. In addition, the fluidic devices may employ zero net mass flow such that an external fluid source or complex plumbing is not required. Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for generating lift provided by a multi-element aircraft wing comprising:
    a main wing element;
    a slat interconnected to the main wing element;
    a flap interconnected to the main wing element;
    a plurality of ports defined in each of the slat, main wing element, and flap; and at least one fluidic device operable to selectively regulate fluid flow into and out of at least one of the plurality of ports in at least two of the slat, main wing element, and flap at critical locations and at predetermined flight conditions in order to control boundary layer flow over at least two of the slat, main wing element, and flap and reduce viscous effects, wherein the at least one fluidic device is operable to selectively regulate fluid flow into and out of the ports in at least two of the slat, main wing element, and flap such that cumulative non-linear augmentation of the coefficient of the lift is achieved with respect to independently regulating fluid flow into and out of a plurality of ports in each of the slat, main wing element, and flap.

2. The system according to claim 1, wherein at least one fluidic device comprises one of an electromagnetic actuator, a piezoelectric actuator, a combustion-based actuator, a diaphragm, a piston, and a pump.

3. The system according to claim 1, wherein at least one fluidic device employs zero net mass flow to regulate fluid flow through the port.

4. The system according to claim 1, further comprising a plurality of fluidic devices, wherein at least one fluidic device is operable to simultaneously actuate at least one respective port associated with each of the slat, main wing element, and flap.

5. The system according to claim 1, wherein each of the slat, main wing element, and flap has upper and lower surfaces, and wherein each port is defined in the upper surface of a respective slat, main wing element, and flap and extends partially between the upper and lower surfaces of a respective slat, main wing element, and flap.

6. The system according to claim 1, wherein at least one port is defined in an aft portion of at least one of the slat and the main wing element.

7. The system according to claim 1, wherein each fluidic device is operable to actuate a respective port.

8. The system according to claim 1, wherein each of the slat and flap is operably interconnected to the main wing element such that an angle of deflection of the slat and flap is capable of being adjusted with respect to the main wing element.

9. The system of claim 1, wherein the at least one fluidic device is operable to simultaneously regulate fluid flow into and out of at least one of the plurality of ports defined in each of the slat, main wing element, and flap.

10. The system of claim 1, further comprising a plurality of ports having a longitudinal configuration and defined in each of the slat, main wing element, and flap, wherein the plurality of ports in each of the slat, main wing element, and flap are spaced apart from one another in a spanwise direction and have a longitudinal axis aligned in a spanwise direction such that each port has a spanwise dimension extending in a spanwise direction that is larger than a fore-aft dimension extending in a fore-aft direction.

11. The system of claim 10, further comprising a plurality of rows of a plurality of ports defined in each of the slat, main wing element, and flap, wherein the plurality of rows are spaced apart from one another in a fore-aft direction and the plurality of ports in each row are spaced apart from one another in a spanwise direction.

12. A system for generating lift provided by a multi-element aircraft wing comprising:
a plurality of wing elements having upper and lower surfaces, wherein each of the wing elements is operatively interconnected to each other;
a plurality of ports defined in each of the plurality of wing elements; and
at least one fluidic device operable to selectively regulate fluid flow into and out of the plurality of ports defined in each of the plurality of wing elements at critical locations and at predetermined flight conditions in order to control boundary layer flow over the plurality of wing elements so as to reduce viscous effects, wherein the at least one fluidic device is operable to selectively regulate fluid flow into and out of the plurality of ports in the plurality of wing elements such that cumulative non-linear augmentation of the coefficient of the lift is achieved with respect to independently regulating fluid flow into and out of a plurality of ports in each of the plurality of wing elements.

13. The system according to claim 12, wherein the plurality of wing elements comprises a slat, a main wing element, and a flap.

14. The system according to claim 12, wherein the wing elements are interconnected such that an angle of deflection of one wing element is adjustable with respect to another wing element.

15. The system according to claim 12, further comprising a plurality of ports having a longitudinal configuration and defined in each of the plurality of wing elements, wherein the plurality of ports in each of the wing elements are spaced apart from one another in a spanwise direction and have a longitudinal axis aligned in a spanwise direction such that each port has a spanwise dimension extending in a spanwise direction that is larger than a fore-aft dimension extending in a fore-aft direction.

16. The system of claim 15, further comprising a plurality of rows of a plurality of ports defined in each of the plurality of wing elements, wherein the plurality of rows are spaced apart from one another in a fore-aft direction and the plurality of ports in each row are spaced apart from one another in a spanwise direction.

17. The system of claim 12, wherein the at least one fluidic device is operable to selectively regulate fluid flow into and out of the plurality of ports in the plurality of wing elements such that a maximum lift coefficient of at least about 5 is obtained.

18. The system of claim 12, wherein the at least one fluidic device is operable to selectively regulate fluid flow into and out of the plurality of ports in the plurality of wing elements such that a maximum ratio of lift over drag of at least about 60 is obtained.

19. The system of claim 12, wherein the at least one fluidic device is operable to selectively regulate fluid flow into and out of the plurality of ports in the plurality of wing elements such that a coefficient of lift comparable to an inviscid lift level is achieved.

20. The system of claim 12, wherein the critical locations comprise at least one of locations of adverse pressure gradients, flow separation, or recirculation.

21. The system of claim 12, wherein the at least one fluidic device is operable to selectively regulate fluid flow such that cumulative non-linear augmentation of the coefficient of the lift is achieved over any angle of attack with respect to independently regulating fluid flow into and out of a plurality of ports in each of the plurality of wing elements.

22. The system of claim 12, wherein the at least one fluidic device is operable to selectively regulate fluid flow such that cumulative non-linear augmentation of the coefficient of the lift is achieved over a range of angles of attack between about 2 and 36 degrees with respect to independently regulating fluid flow into and out of a plurality of ports in each of the plurality of wing elements.

23. The system of claim 12, wherein the at least one fluidic device is operable to selectively regulate fluid flow such that cumulative non-linear augmentation of the coefficient of the lift is achieved over at least an entire linear range of angles of attack with respect to independently regulating fluid flow into and out of a plurality of ports in each of the plurality of wing elements.

24. A method for increasing lift of an aircraft comprising:
initiating fluid flow over a multi-element aircraft wing comprising a main wing element, a slat, and a flap; and
selectively regulating fluid flow through at least one of a plurality of ports defined in at least two of the main wing element, slat, and flap at critical locations and at predetermined flight conditions in order to control boundary layer flow over at least two of the main wing element, slat, and flap and reduce viscous effects, wherein the fluid flow is selectively regulated into and out of the ports in at least two of the slat, main wing element, and flap such that cumulative non-linear augmentation of the coefficient of the lift is achieved with respect to independently regulating fluid flow into and out of a plurality of ports in each of the slat, main wing element, and flap.

25. The method according to claim 24, wherein initiating comprises initiating take-off or landing of the aircraft.

26. The method according to claim 24, wherein regulating comprises ingesting fluid into a respective port or expelling fluid from a respective port.

27. The method according to claim 24, further comprising adjusting an angle of deflection of at least one of the main wing element, slat, and flap with respect to one another.

28. The method of claim 24, wherein regulating comprises locating at least one of the plurality of ports in at least two of the main wing element, slat, and flap corresponding to a critical location and actuating the ports at the critical locations at predetermined flight conditions.

29. The method of claim 24, wherein regulating comprises regulating fluid flow such that a maximum lift coefficient of at least about 5 is obtained.

30. The method of claim 24, wherein regulating comprises regulating fluid flow such that a maximum ratio of lift over drag of at least about 60 is obtained.

31. The method of claim 24, wherein regulating comprises regulating fluid flow such that a coefficient of lift comparable to an inviscid lift level is achieved.

32. The method of claim 24, wherein the critical locations comprise at least one of locations of adverse pressure gradients, flow separation, or recirculation.

33. The method of claim 24, wherein regulating comprises regulating the fluid flow such that cumulative non-linear augmentation of the coefficient of the lift is achieved over any angle of attack with respect to independently regulating fluid flow into and out of a plurality of ports in each of the slat, main wing element, and flap.

34. The method according to claim 24, wherein regulating comprises actuating a fluidic device associated with at least one port.

35. The method according to claim 34, wherein actuating comprises actuating a plurality of fluidic devices simultaneously.

36. The method according to claim 34, wherein actuating comprises actuating at least one port associated with the main wing element, slat, and flap to increase a stall margin of the aircraft during take-off or landing.

* * * * *